United States Patent [19]

Zdunek

[11] Patent Number: 4,692,945
[45] Date of Patent: Sep. 8, 1987

[54] DISPATCH TRUNKED RADIO SYSTEM
[75] Inventor: Kenneth J. Zdunek, Schaumburg, Ill.
[73] Assignee: Motorola, Inc., Schaumburg, Ill.
[21] Appl. No.: 933,367
[22] Filed: Nov. 19, 1986

Related U.S. Application Data

[63] Continuation of Ser. No. 687,810, Dec. 31, 1984, abandoned.

[51] Int. Cl.[4] .............................................. H04B 7/14
[52] U.S. Cl. ........................................ 455/17; 455/38; 455/53; 370/82; 370/94; 370/110.1
[58] Field of Search ....................... 455/15, 17, 31, 34, 455/38, 53, 54, 56, 62; 371/39, 45; 370/82, 94, 95, 110.1; 379/63

[56] References Cited

U.S. PATENT DOCUMENTS

| | | | |
|---|---|---|---|
| 4,012,597 | 3/1977 | Lynk, Jr. et al. | 455/54 |
| 4,027,243 | 5/1977 | Stackhouse et al. | 455/54 |
| 4,055,832 | 10/1977 | En . | |
| 4,156,867 | 5/1979 | Bench et al. | 371/39 |
| 4,217,660 | 8/1980 | En . | |
| 4,271,520 | 6/1981 | Coombes et al. . | |
| 4,312,070 | 1/1982 | Coombes et al. | 371/45 |
| 4,360,927 | 11/1982 | Bowen et al. | 455/17 |
| 4,519,068 | 5/1985 | Krebs et al. . | |
| 4,553,262 | 11/1985 | Coe | 455/15 |

Primary Examiner—Jin F. Ng
Attorney, Agent, or Firm—Steven G. Parmelee

[57] ABSTRACT

The present invention contemplates an improved dispatch trunked radio system which provides for individual subscriber to subscriber communication as well other enhanced trunking features. An expanded "dual-word" signalling protocol provides an improvement over prior "single word" signalling protocols by increasing the versatility of commands which may be communicated between the components of the trunked radio system. The "dual-word" signalling protocol of the present invention remains compatible with prior "single-word" subscriber units.

16 Claims, 21 Drawing Figures

FIRST WORD

SECOND WORD

FIRST WORD

SECOND WORD

STANDARD DECODED ISW FORMAT
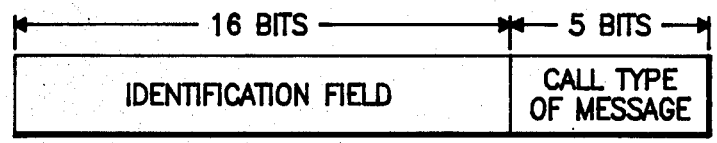
Fig. 2a
—PRIOR ART—
STANDARD DECODED OSW FORMAT
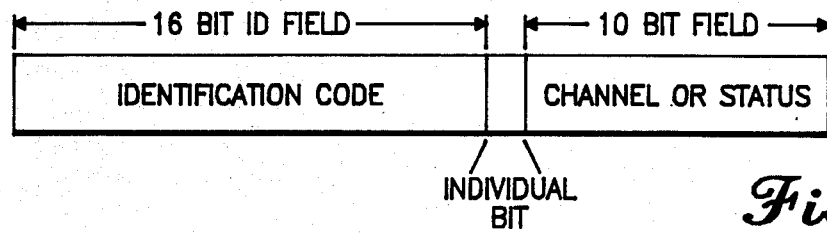
Fig. 2b
PRIVATE CALL II CONVERSATIONS
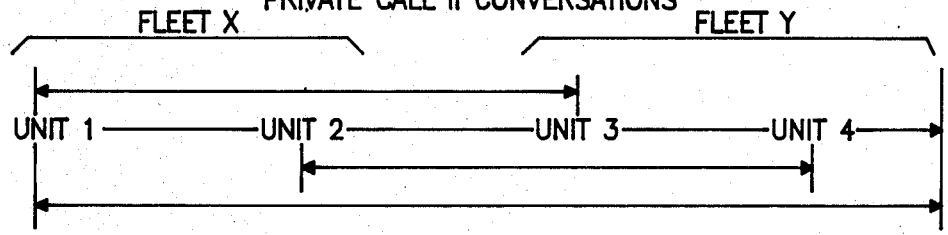
Fig. 3
Fig. 4a
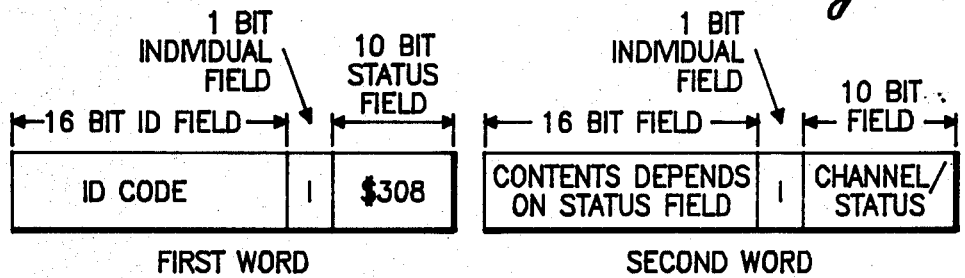
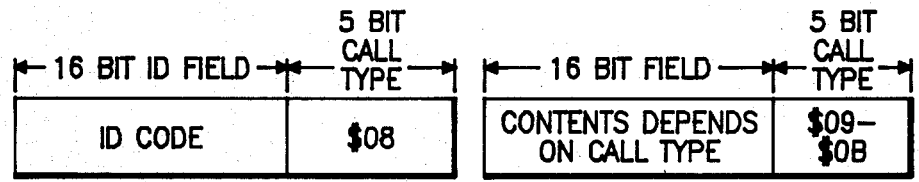
Fig. 4b

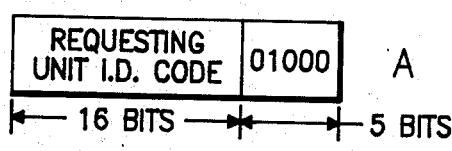
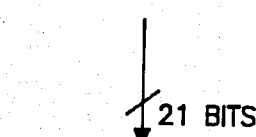
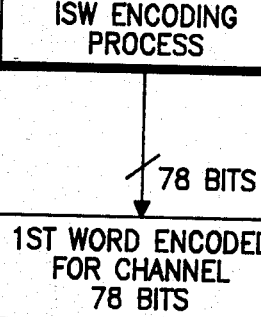
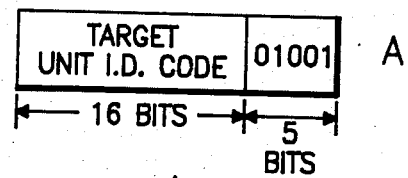
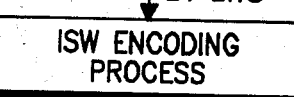
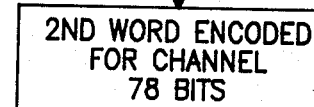
Fig. 9              Fig. 10

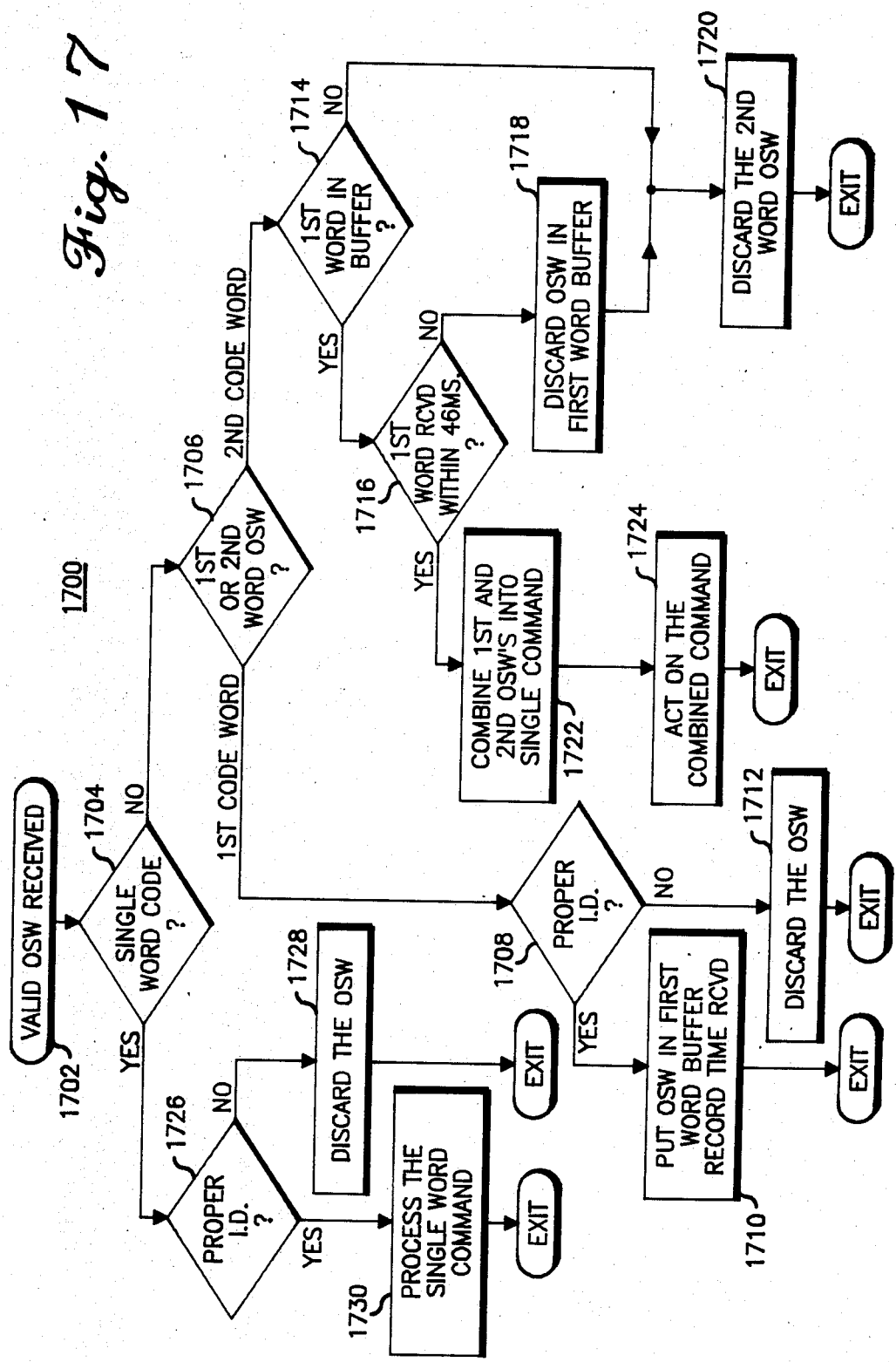

DISPATCH TRUNKED RADIO SYSTEM

This is a continuation of application Ser. No. 687,810, filed Dec. 31, 1984, now abandoned.

FIELD OF THE INVENTION

This invention relates to the field of trunked radio systems and specifically to an improved method and means for dispatch trunked radio control which provides an expanded array of features including uninterrupted private communication between trunked subscriber units.

BACKGROUND OF THE INVENTION

Trunked radio systems have developed in response to an ever increasing demand for radio communications services. Previous radio communications systems have expanded to the point where potential users are denied service because the available frequency resource is being utilized. Typically, subscribers using older mobile radio system were constrained to operate on a single frequency, thus limiting the number of users which could be expected to be assigned to that frequency. Trunked radio systems alleviate this inherent spectrum limitation by actively assigning operating frequencies to mobile radios based on channel availability. In other words, the mobile radios used as subscriber units in trunked radio systems are operative on a number of frequencies which are assigned to the subscriber unit 102 based on channel availability.

A prior trunked radio system is shown and described in U.S. Pat. No. 4,012,597, entitled "Transmission Trunked Multichannel Dispatch System with Priority Queuing", by Lync et al., filed Nov. 24, 1975 and assigned to Motorola, Inc., Schaumburg, Ill. The trunked radio system described in this patent is referred to as a dispatch trunked radio system. In a dispatch trunked radio system, a mobile radio establishes communication on the system by transmitting a channel request to a system central controller on a predetermined inbound frequency. The central control unit responds to the subscriber unit with a signalling word which authorizes the subscriber unit to operate on a specific communication channel. Typically, the channel request transmitted from the subscriber unit includes information which identifies the subscriber unit to the central control unit. Additionally, the subscriber unit responds to commands sent from the central control unit based on radio I.D. information included with outbound channel assignment information. Prior dispatch trunked radio systems developed around a basic unifying protocol which communicates radio I.D. and channel assignment information. However, these systems are inherently limited in the type of features which may be implemented because of the limited amount of information which is communicated between the central control unit and the mobile radios of the dispatch trunked radio system.

SUMMARY OF THE INVENTION

In summary, the present invention contemplates an improved dispatch trunked radio system having an expanded unifying signalling protocol which may be advantageously used to implement enhanced system features which remaining compatible with prior dispatch trunked radio systems. The subscriber units of the present invention are capable of generating and receiving signalling information in accordance with a single word or concatenated dual-word signalling scheme. The central control unit also decodes and generates signalling information in accordance with a single or concatenated dual-word signalling scheme, and generates channel controlling information in accordance with the signalling scheme of the present invention.

Accordingly, it is an object of the present invention to provide a dispatch trunked radio system having expanded capabilities which is compatible with prior dispatch trunked radio systems.

It is another object of the present invention to allow secure individual mobile-to-mobile radio communication without regard to secondary fleet, sub-fleet, or group assignments.

It is still another object of the present invention to provide a method and means for a subscriber unit to receive a private call from another subscriber unit even though the subscriber unit may be preset to receive calls on the sub-fleet level.

It is yet another object of the present invention to provide a method and means for a subscriber unit to receive a private call from another subscriber unit to respond to the call in a totally private manner.

BRIEF DESCRIPTION OF THE DRAWINGS

FIGS. 2a and 2b are diagrams of the inbound and outbound signalling word formats of a prior dispatch trunked radio system, before channel encoding.

FIG. 3 is a diagram detailing the individual conversations made possible on a trunked system by execution of the protocol of the present invention.

FIGS. 4a and 4b are diagrams of the inbound and outbound signalling word formats of the dispatch trunked radio system of the present invention, prior to channel encoding.

FIG. 9 is a diagram showing the contents and encoding of the first word of the ISW of the present invention which contains the subscriber unit identification (I.D.) code of the requesting unit.

FIG. 10 is a diagram showing the contents and encoding of the second ISW word which contains the I.D. of target mobile.

FIGS. 12 is a diagram showing the encoded first portion of the Outbound Signalling Word of FIG. 4a.

FIGS. 13 is a diagram showing the second portion of the Outbound Signalling Word of FIG. 4a.

FIG. 14b is a diagram showing the data word structure which results from the coding process of FIG. 14a.

FIGS. 15 through 17 are detailed control flow diagrams detailing the step-by-step operation of the present invention.

DETAILED DESCRIPTION OF THE DRAWINGS

Figure 1:
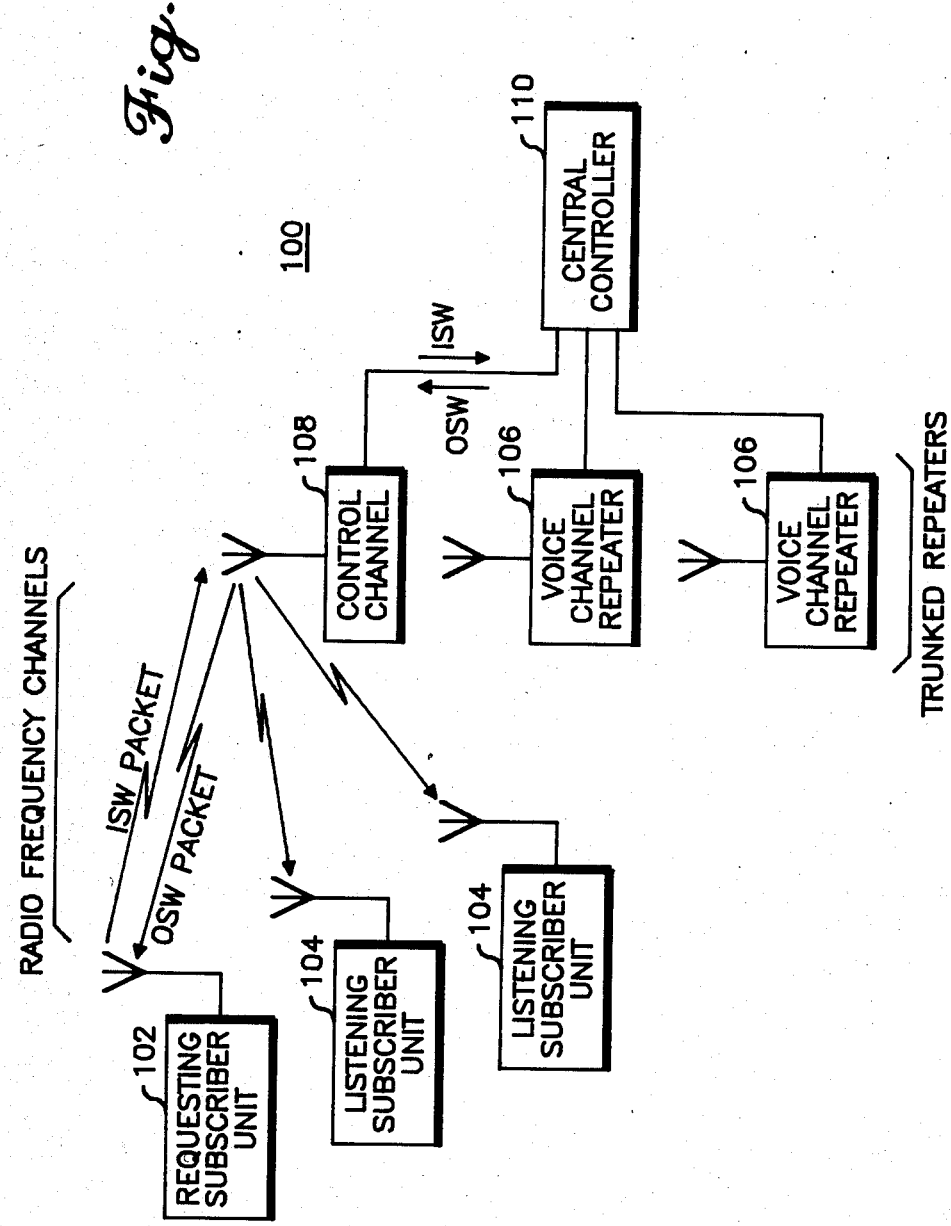
FIG. 1 is a block diagram of a dispatch trunked radio system.

The operation of a dispatch trunked radio system is summarized in conjunction with FIG. 1. The dispatch trunked radio system 100 consists of subscriber units 102, 104 (mobiles or portables), trunked repeaters 106, and a trunking central controller 110. The trunked central controller 110 and trunked repeaters 106 may also be connected to an "interconnect control unit" (not shown) which serves to connect the trunked repeaters 102 to a public switched telephone network. In the quiescent state, all subscriber units monitor the outbound frequency of the trunked repeater 108 which is designated the "control channel."

To establish a "dispatch call" between a group of units operating on the trunked system 100, a subscriber unit sends a data packet called an ISW (Inbound Signaling Word) on the inbound frequency of the Control Channel repeater. The ISW contains the requesting unit's unique ID code, consisting of a fleet ID and an individual ID, plus a "subfleet" code indicating to which group of units it wants to talk to. The ISW also contains a unique "call type" code which indicates that a dispatch call is the type of call desired. The request is forwarded to the Central Controller, which decodes the request, and transmits a data packet called an OSW (Outbound Signaling Word) to all the subscriber units which are monitoring the outbound Control Channel. The OSW is a "channel grant" which contains the subfleet code, the requesting unit's ID code, and the voice channel number assigned for the conversation. The OSW causes the requesting unit to move to the voice channel as listening units. In this way, a group or "subfleet" call conversation may be established. If all the voice channels are in use, the Central Controller sends the requesting subscriber unit a "Busy OSW".

Further technical description of a fixed end central control unit for a dispatch trunked radio system which may advantageously be used with the present invention is set forth in Motorola, Inc. instruction manual number 68P81047E50-0, entitled "Trunked Radio System Central Controller". Repeaters suitable for use with the present invention are described in Motorola, Inc. instruction manual number 68P81025E60-D, entitled Micor Base and Repeater Station Manual". Subscriber units suitable for use with the present invention are described in Motorola instruction manual number 68P81066E80-0, entitled "Trunked Syntor X Smartnet/Dual Operation FM Two-Way Radio". The instruction manuals set forth above are herein incorporated by reference and are available from Motorola, Inc., Technical Writing Services Department, 1301 E. Algonquin Rd., Schaumburg, Ill., 60196.

Referring now to FIG. 2, the standard decoded ISW's and OSW's are shown in detail. The ISW's and OSW's are encoded for error correction, detection, and packet sync according to the procedures described in FIGS. 11a and 14a, respectively. The information sources mentioned in block 1102 of FIG. 11 and block 1402 of FIG. 14 for the standard ISW's and OSW's are shown in FIGS. 4b and 4a, respectively. The procedure for the addition of the code word for error detection and the auto-sync sequence are described in U.S. Pat. Nos. 4,271,520 and 4,312,070, the procedure for bit interleaving and burst error correction are described in U.S. Pat. Nos. 3,882,457 and 4,055,832, all of the above patents being incorporated herein by this reference.

Referring now to FIG. 3, there is shown a diagram detailing the individual conversations made possible by execution of the present invention. The present invention provides for totally private conversations between any two subscriber units on the dispatch trunked radio system. According to the principles of the present invention, a "dual" or "paired" ISW format is used to send requests for various types of radio calls, and a dual OSW is used for the corresponding channel grant. An example of the types of calls which are supported by the signalling protocal of the present invention areas follows: A subscriber unit can initiate a totally private call to a another subscriber unit 104 in the same fleet. The present invention provides that the the target unit 104 can respond in a totally private manner to the initiating caller. The principles of the present invention also provide that a subscriber unit can initiate a totally private call to another subscriber unit which is not in the same fleet as is shown by the conversation between units 1 and 3 of FIGS. 1 and 3. The target unit 103 can respond in a totally private manner to the initiating caller, unit 1. Each line indicates a totally private conversation which may be initiated by any party shown in FIG. 3.

FIGS. 4a and 4b illustrate signalling word formats which are available in a system using the signalling protocol of the present invention. According to the principles of the present invention, an Inbound Signalling word may be concatenated in a "Dual Word" format to extend the number of inbound instructions available to the Central Controller 110 of FIG. 1. The specific organization of the concatenated Inbound Signalling Word of the present invention is shown in FIG. 4b.

As mentioned above, the encoding process of single word ISW's is described in the above referenced U.S. patents. The encoded ISW's are then sent on the control channel in successive 23.33 millisecond access slots.

According to the principles of the present invention, OSW's may be concatentated in a "Dual Word" format to extend the number of outbound messages and addresses which may be generated to control the subscriber units. The principles of the present invention provide that decoded dual-word OSW's have a predetermined form.

If a concatenated outbound signalling word is to be generated by a subscriber unit, the present invention provides that the first word of the signalling sequence must contain a "First Word" identifying code in the Status Field. The second word follows in the word slot immediately following the first, and contains a channel number or status indicating code in the 10 bit field. The principles of the present invention provide that the interpretation of the 16 bit "ID" field in the Second Word depends on the contents of the Status Field of the second inbound signalling word.

The OSW's described above may be encoded for transmission on the outbound control channel for sync, error correction and detection according to patents set forth above. The central controller transmits the encoded dual OSW in successive 23.3 millisecond time slots on the Outbound Control Channel.

Figure 5:
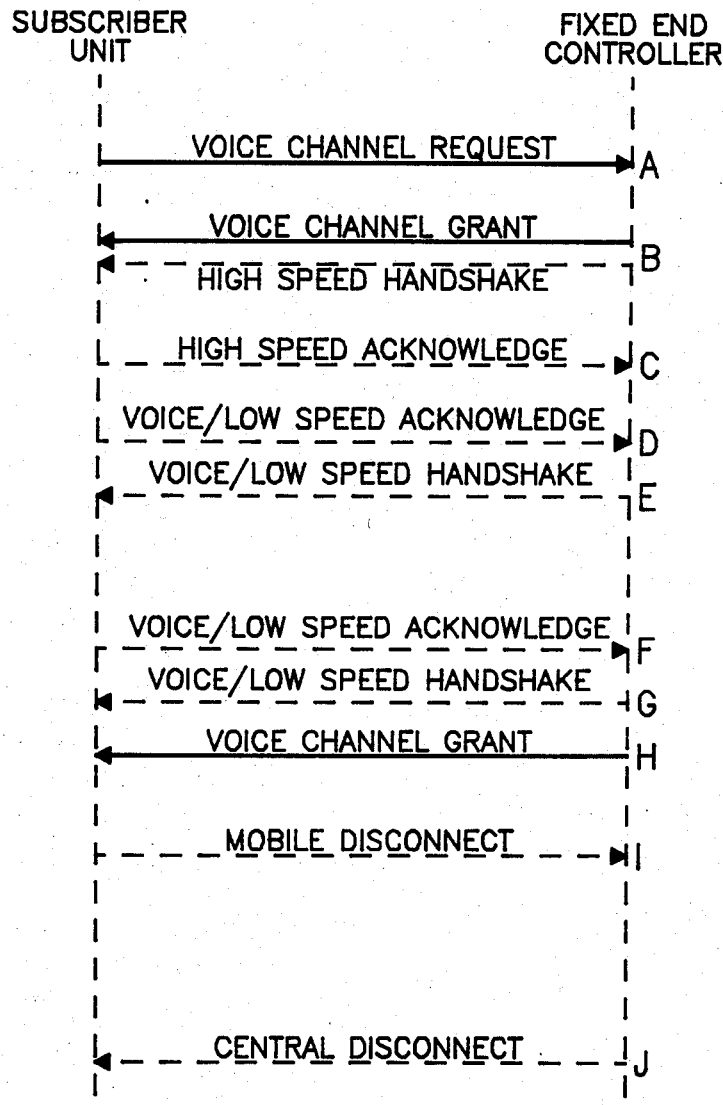
FIG. 5 is a detailed timing diagram detailing the communication between a subscriber unit and the central control unit during the execution of the protocol of the present invention.

FIG. 5 shows a standard dispatch trunked system channel access procedure. To initiate a conversation, the subscriber unit 102 requesting service sends a voice channel request "A" in the form of an ISW (Inbound Signalling Word) to the Fixed End Trunking Controller on the inbound control channel. According to the principles of the present invention, the ISW may take the form of a single or dual word ISW. If a channel is available, the fixed end central controller 110 responds wtih a voice channel grant "B" in the form of an OSW (Outbound Signalling Word) on the outbound control channel as shown. In the preferred embodiment of the present invention the fixed end central controller 110 responds with a Dual Word OSW if a dual word ISW was received from the subscriber unit. At the same time that the channel grant is sent on the outbound control channel, a high speed acknowledge signal is sent on the outbound assigned voice channel. The high speed acknowledge signal contains the group identification code of the requesting unit and is sent at 3600 BPS. After detecting the channel grant on the control channel, the subscriber unit requesting service changes frequencies to the assigned voice channel, and decodes the high speed handshake signal from the fixed end central controller 110. It then responds with a high speed acknowledge tone "C" which indicates to the fixed end central controller 110 that it has successfully reached the voice channel. Upon detecting the high-speed acknowledge signal from the subscriber unit, the fixed end central controller 110 enables the audio path in the assigned repeater, removes the high speed handshake, and starts sending a sub-audible low speed handshake containing the group I.D. of requesting unit. After sending the high speed acknowledge for a fixed time interval, line "D" shows that the transmitting subscriber unit 102 enables the microphone audio and begins to send voice with a sub-audible low speed handshake signal. According to line "E", receiving mobile units enable the audio to their speakers when they decode the low-speed handshake signal from the fixed end central controller 110. Lines "F", and "G" represent that voice and sub-audible low speed acknowledge, and voice and sub-audible low speed handshake are sent continuously on the inbound and outbound voice channel for the duration of the requesting mobile transmission. The voice channel grant "H" in the form of an OSW is repeated on the outbound control channel for the duration the requesting mobile transmission. When the operator of the requesting unit releases PTT, the radio sends in a sub-audible disconnect signal "I" indicating end of transmission to the fixed end central controller 110. Upon receipt of the mobile disconnect signal, the fixed end central controller 110 disables the audio path in the asigned voice repeater. After a time interval expires after mobile disconnect is received at the trunking fixed end central controller 110, the controller sends a sub-audible central diconnect signal "J" on the outbound voice channel. This signal causes all subscriber units on the voice channel to return to the control channel. The voice channel is now available for reassignment to a new call.

FIG. 17 illustrates the general mechanism by which a requesting (or target) subscriber unit interprets concatenated dual word OSW's in accordance with the method of the present invention. The procedure starts with item 1702 when a valid OSW word is decoded in a receiving radio. Decision 1704 determines whether the decoded word contains a single word code in the 10 bit status field. If a single word code was detected, decision 1726 checks the ID code. If the I.D. matches that of the requesting unit, then the single word OSW command is processed at item 1730. If decision 1726 does not detect a proper I.D., the OSW command is discarded at item 1728. If at decision block 1704, a valid OSW is received with a valid 1st or 2nd word code in the status field, then dual word processing commences with decision block 1706. If the "First Word" code is present in the OSW, then the requesting unit verifies, at decision 1708, that the I.D. is that of the target unit 104 it requested. If a valid "First Word" is detected, then item 1710 places the OSW in a "First Word buffer" to await the receipt of the second word. A timer is also started. If the I.D. is not the I.D. of the target unit, then the OSW is discarded by item 1712.

If a second word code is present in the decoded OSW, then the 1st word buffer is checked by decisions 1714 and 1716. If no first word has been received, then the second word is discarded by item 1720. If a first word is present in the buffer, then the timer started in 1710 is checked by decision 1716. If more than two OSW word times (46 Ms.) have elapsed, then the second word cannot be part of the dual word pair, and both words are discarded by items 1718 and 1720.

If the second OSW word has been received within the proper time interval of the first word (stored in the buffer), then a dual OSW command (busy or channel grant) has been successfully received. The combined command is acted upon by item 1724. The action represented by item 1724 will be discussed more fully in the context of FIGS. 6 through 8.

Figure 6:
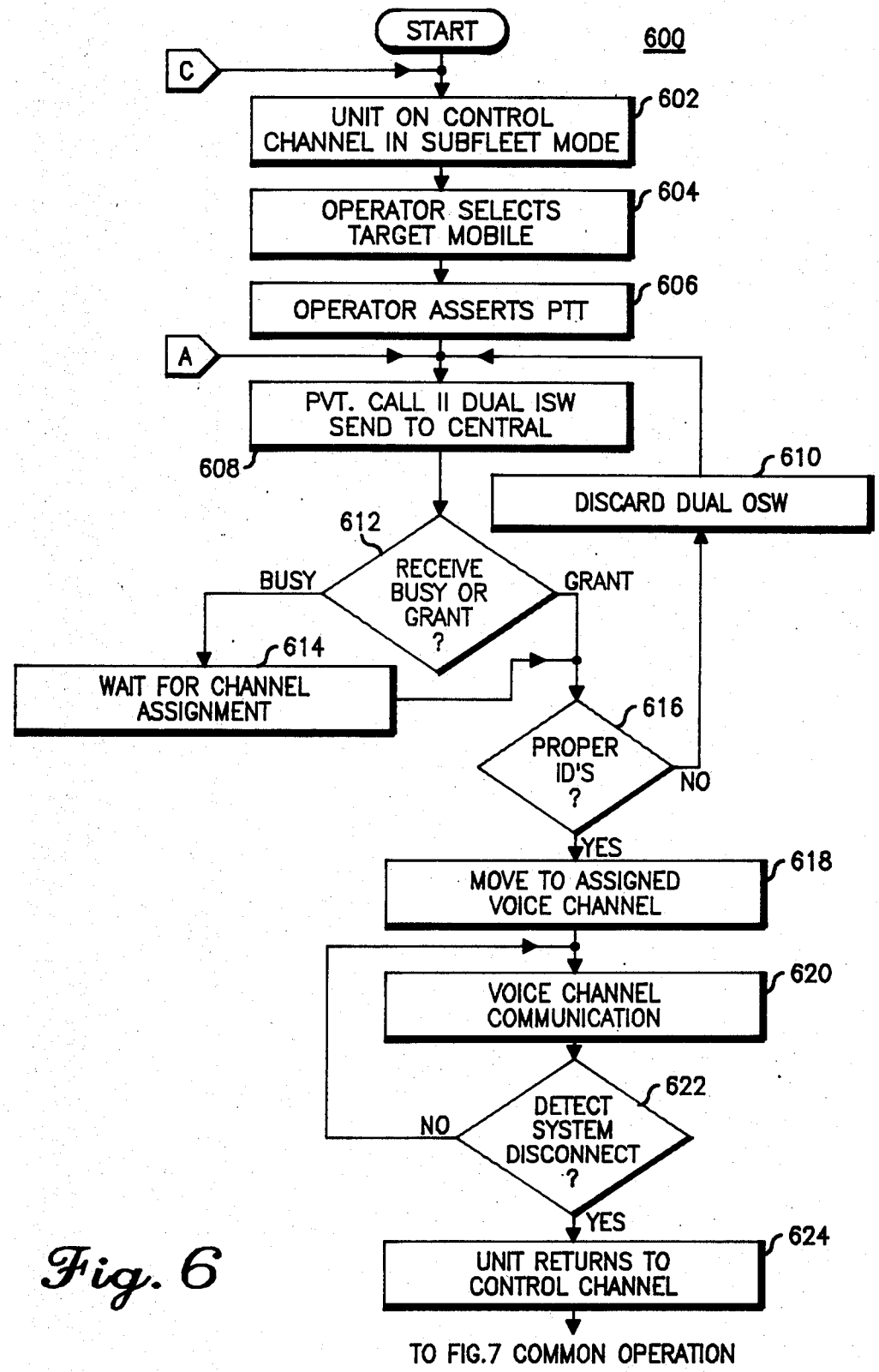
FIGS. 6 through 8 are flow diagrams detailing the overall operation of the present invention.
Figure 7:
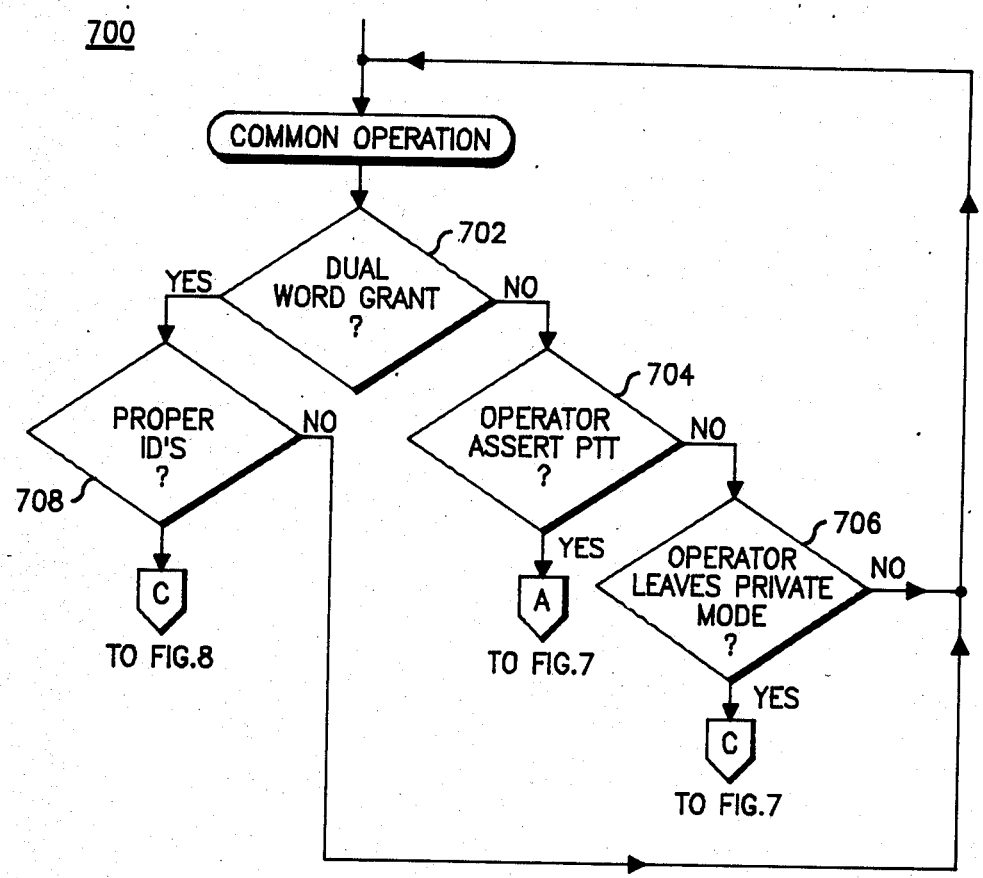
Figure 8:
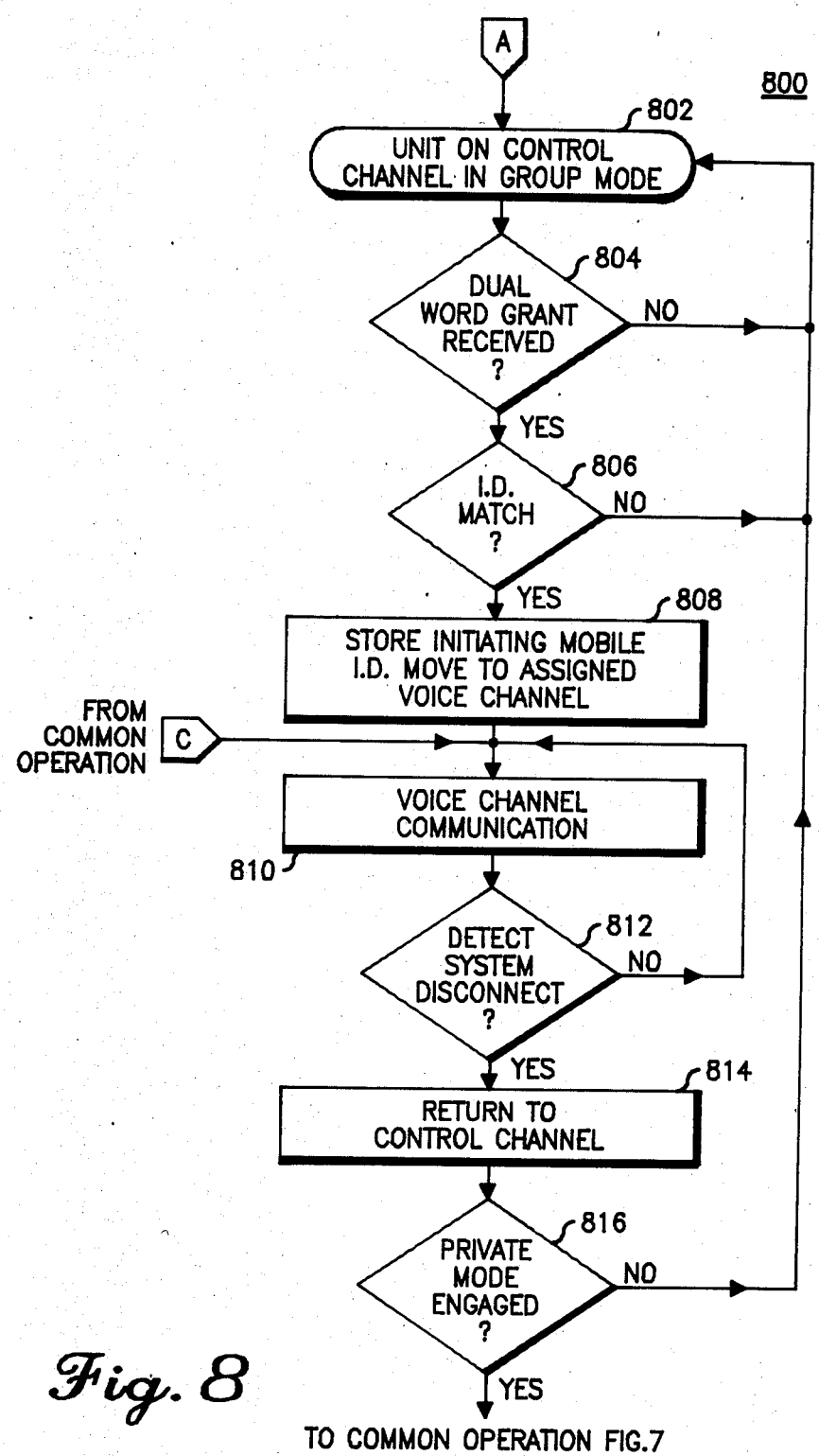

FIGS. 6 through 8 are flow diagrams detailing the overall operation of the present invention. FIG. 6 describes dual word signalling operation from the viewpoint of the mobile subscriber unit requesting the an enhanced system feature.

Figure 11A:
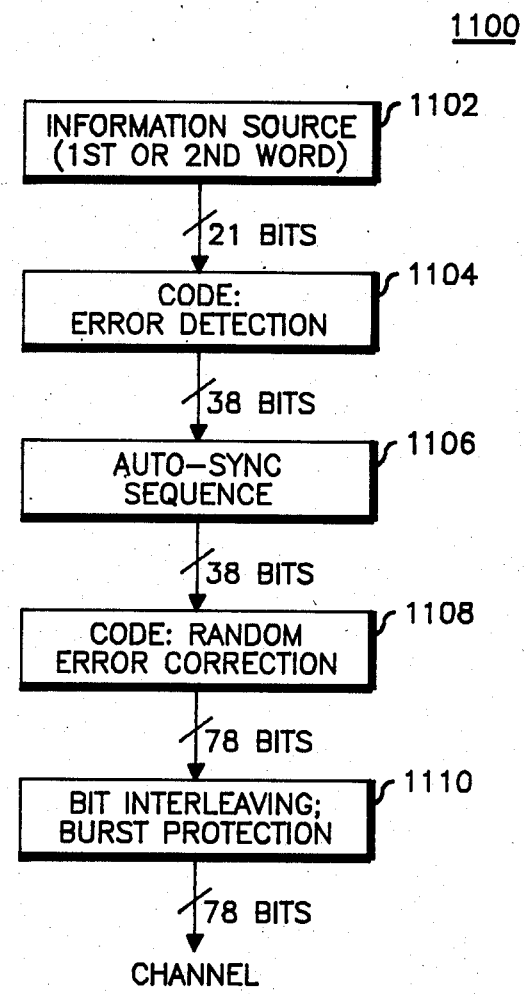
FIG. 11a describes in detail the procedure for encoding each of the ISW's.
Figure 11B:
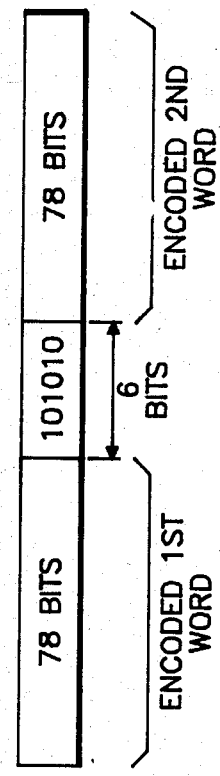
FIG. 11b ilustrates the form of the dual ISW request as it is presented to the FM modulator of the requesting radio.

Typically, a subscriber unit is operated in a quiescent mode represented by item 602 where the subscriber unit is monitoring the outbound control channel in a subfleet mode. In this mode, the subscriber unit will respond to calls on a group level. To enter the individual call mode of the present invention, the operator selects a target subscriber via pushbutton or keypad and display, (item 604), and asserts the PTT switch (item 606). A dual word ISW is then transmitted to the fixed end central controller 110 by item 608 on the inbound control channel. The contents and encoding of the first word of the ISW is described in further in conjunction with FIG. 9. The first word contains the subscriber unit identification (I.D.) code of the requesting unit. The contents and encoding of the second ISW word is described in conjunction FIG. 10. The second word contains the I.D. of target mobile. FIG. 11a described in detail the procedure for encoding each of the ISW's. The procedure for encoding the dual-word ISW's of the present invention may be the same as the procedure described above for single-word ISW's. FIG. 11b illustrates the form of the dual ISW request as it is presented to the FM modulator of the requesting radio.

Figure 14B:
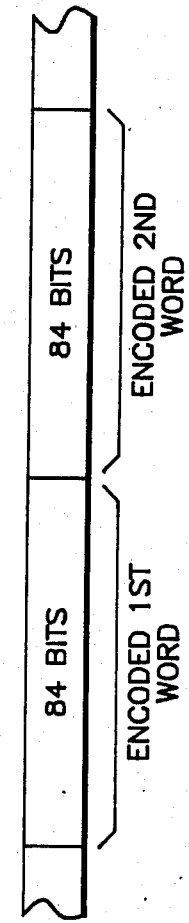
Figure 13:
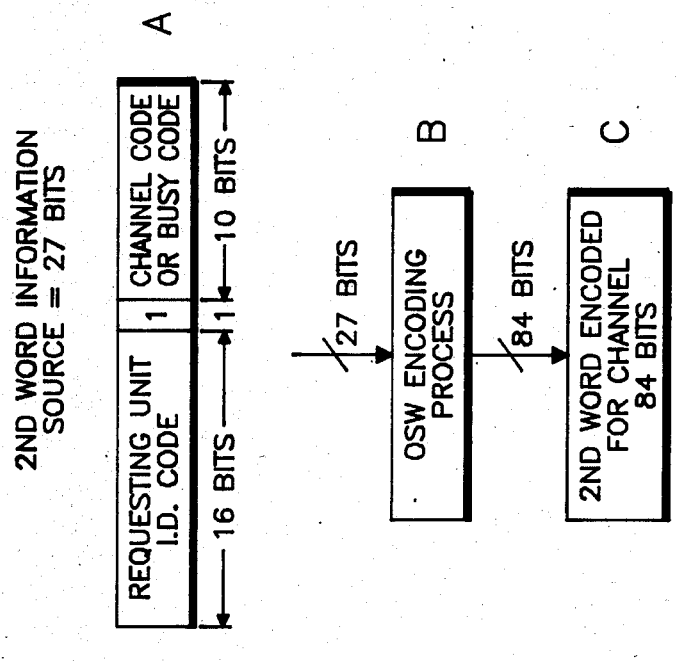
Figure 12:
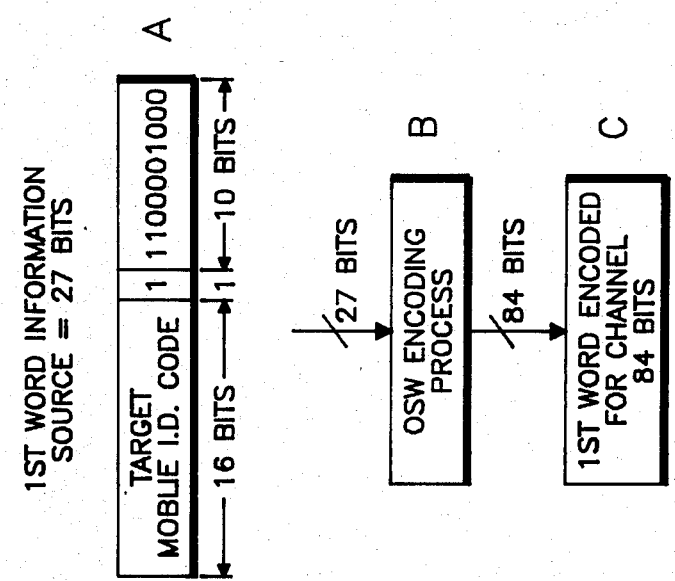
Figure 14A:
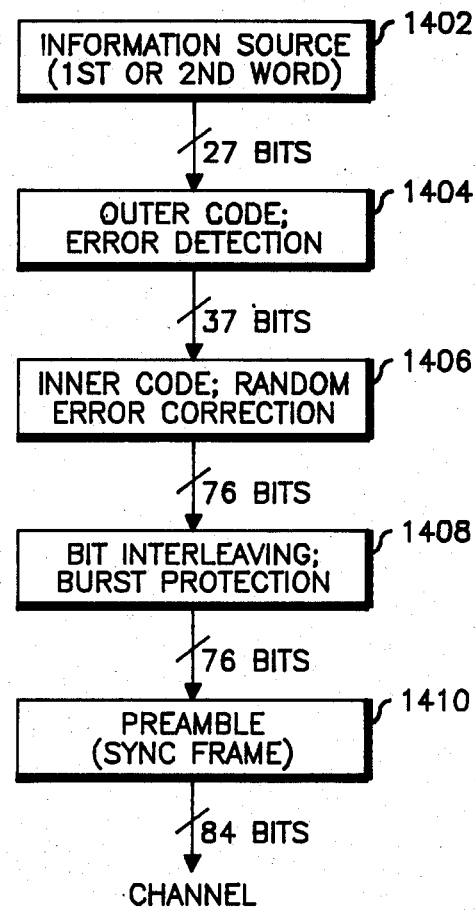
FIG. 14a is a time sequence diagram showing the encoding process associated with the Outbound Signalling Word generated in accordance with the signalling protocol of the present invention.

After the dual ISW request is sent to the central controller, decision 612 causes the subscriber unit to search for a channel "busy" or channel "grant" command on the outbound control channel from the central controller. According to the principles of the present invention, the channel "busy" or channel "grant" takes the form of a dual word OSW if a dual word ISW was received by the fixed end central controller 110. The contents and encoding of the first word of the dual-word OSW is shown in FIG. 12. The first OSW contains the ID of the target unit 104 of the individual call. The contents and encoding of second OSW is shown in FIG. 13. The second OSW contains the ID of the unit requesting the individual call. FIG. 14a illustrates in detail the procedure by which the first and second OSW words are encoded. The procedure may be the same as the encoding procedure for standard OSW's. FIG. 14b shows the form of dual OSW as it is transmitted from the fixed end central controller 110.

Referring still to FIG. 6, if a dual word "busy" is received by the requesting unit, then item 614 causes the subscriber unit to wait for a dual word channel "grant". When a dual word grant is received immediately after the request, or after a busy has been received, then the ID's in the first and second words are checked by decision 616. According to the principles of the present invention, the first word of the channel grant OSW must contain the I.D. of the target subscriber unit, the second word must contain the ID of the requesting unit. If the proper ID's are not present, then decision 616 selects item 610 which disregards the dual-word channel grant OSW. If a busy signal has not been received, the subscriber unit then returns to item 608 and resends the dual ISW request. If the proper ID's are present, then item 618 causes the requesting subscriber unit to move to the channel assigned by the second word of the dual word grant. Item 620 then enables voice communication on the assigned channel. The high-speed handshake and low-speed handshake signals described in FIG. 5 are derived using the ID code of the subscriber unit requesting the dual word private call.

When the subscriber unit dekeys on the voice channel and system disconnect is detected by the subscriber unit 102, as shown in FIG. 5, "J", then decision 622 an item 624 return the subscriber unit to the trunking control channel, and dual-work private call common operation commences with routine 700 of FIG. 7. If the system disconnect has not been detected on the voice channel, the requesting unit continues communication on the voice channel at item 620.

Referring now to FIG. 7, there is another flow diagram of the overall operation of the protocol of the present invention. When a radio is in the dual-word private call mode on the trunked system control channel, and a dual-word request has not been sent by the unit in response to an operator generated PTT, it is in a mode of operation "common" to a requesting or target radio.

If a dual word grant is received by item 702 and PTT has not been detected by decision 704, then control passes to "Target Mobile" 800 operation FIG. 8. The first word must contain the radios own ID, and the second word of the dual OSW must contain the ID the unit previously requested. If these ID's are not present in the dual word, the command is discarded by decision 708, and the radio continues to wait for dual word grants.

If a dual word grant has not been received, but the operator has asserted PTT, then control passes back to FIG. 7, point A for a requesting subscriber unit. A radio which has previously been a "target" radio uses the I.D. latched as the requesting unit to call that unit back.

If the operator has not asserted PTT, but the operator has left the private mode by releasing the private button or selecting a group call mode, then operation returns to the group call mode of FIG. 7, point "C".

Referring now to FIG. 8, the target radio operation for dual-word private call begins with item 802 in the group call mode on the control channel. If decision 804 detects a dual-word grant according to the procedure described in FIG. 17, then decision 806 checks the I.D.'s. If the first word contains the radio's own I.D., and the second word contains a channel number in the status field, then the ID in the second word is assumed to be the I.D. of the initiating mobile and item 808 stores the I.D. to be used in responding to the initial caller if required. Item 810 then moves the target subscriber to the assigned voice channel and commences voice channel communication, expecting the high speed handshake and low speed handshake signals to be derived from the I.D. of the initiating radio which was stored by item 808 above.

Voice channel communications continues until decision 812 detects system disconnect as described in FIG. 5, "J". Item 814 then returns the target unit 104 to the control channel.

If the mobile radio operator has engaged the private mode by depressing a button or other means, then the ID of the requesting unit stored by item 808 above is latched, and decision 816 passes control to the common operation routine 700 of FIG. 7.

If the private mode has not been engaged by the target radio operator, decision 816 selects entry point 802 and the group call mode continues.

FIG. 9 is a diagram showing the contents and encoding of the first word of the ISW of the present invention which contains the subscriber unit identification (I.D.) code of the requesting unit. The information source for the first ISW word "A" consists of 21 bits comprised of the 16 bit requesting subscriber unit I.D., followed by the 5 bit binary sequence 01000. The ISW encoding process "B" converts the 21 bit information source into a 78 bit data stream "C" to be sent over the channel. The process "B" is further described in conjunction with FIG. 11a. Starting with the 21 bit information sequence, the code 1104 and the auto-sync sequences 1106 are added according to the teachings of the patents set forth above.

FIG. 10 is a diagram showing the contents and encoding of the second ISW word which contains the I.D. of target mobile. The information source of the second ISW word "A" consists of 21 bits comprised of the 16 bit target subscriber unit I.D., followed by the 5 bit binary sequence 01001. The ISW encoding process "B" converts the 21 bit information source into a 78 bit data stream "C" to be sent over the channel. The process "B" is further described in the patents set forth above.

FIG. 11b illustrates the form of the dual ISW request as it is presented to the FM modulator of the requesting radio. The two 78 bit ISW sequences derived according to the procedure described above are presented to the F.M. modulator of the subscriber unit as two serial binary sequences separated by the 16 bit binary pattern 101010.

Referring now to FIG. 12, the 27 bit information sequence of FIG. 4a consists of the 16 bit I.D. field of the target subscriber unit 104, followed by the binary number 1, and then followed by the 10 bit binary sequence "A" 1100001000. The OSW encoding process "B" converts the 27 bit information field to 84 bits "C" to be sent over the R.F. channel.

The process "B" is further described in conjunction with FIG. 14a. Starting with the 27 bit information sequence 1402, 10 bits of parity for error detection are added by item 1404. The random error correction and bit interleaving are provided for in the patents set forth above. This process results in a sequence of 76 bits. An 8 bit binary synchronization sequence is added as a preamble by item 1410 for a total of 84 bits.

FIG. 13 is a diagram showing the second portion of the Outbound Signalling Word of FIG. 4a. The 27 bit information sequence consists of the 16 bit I.D. field of requesting subscriber unit, followed by the binary number 1, and then followed by the 10 bit binary sequence "A" which corresponds to a channel assignment or predesignated "busy" code. The OSW encoding process "B" converts the 27 bit information field to 84 bits "C" to be sent over the R.F. channel.

The process "B" is further described in conjunction with FIG. 14a. Starting with the 27 bit information sequence 1402, 10 bits of parity for error detection are added by item 1404. The random error correction and bit interleaving are provided for in the patents set forth above. This process results in a sequence of 76 bits. An 8 bit binary synchronization sequence is added as a preamble by item 1410 for a total of 84 bits. FIG. 14b shows the two 84 bit sequences described above in the form in which they are presented to the F.M. modulator of the control channel transmitter as two consecutive binary sequences.

Figure 15:
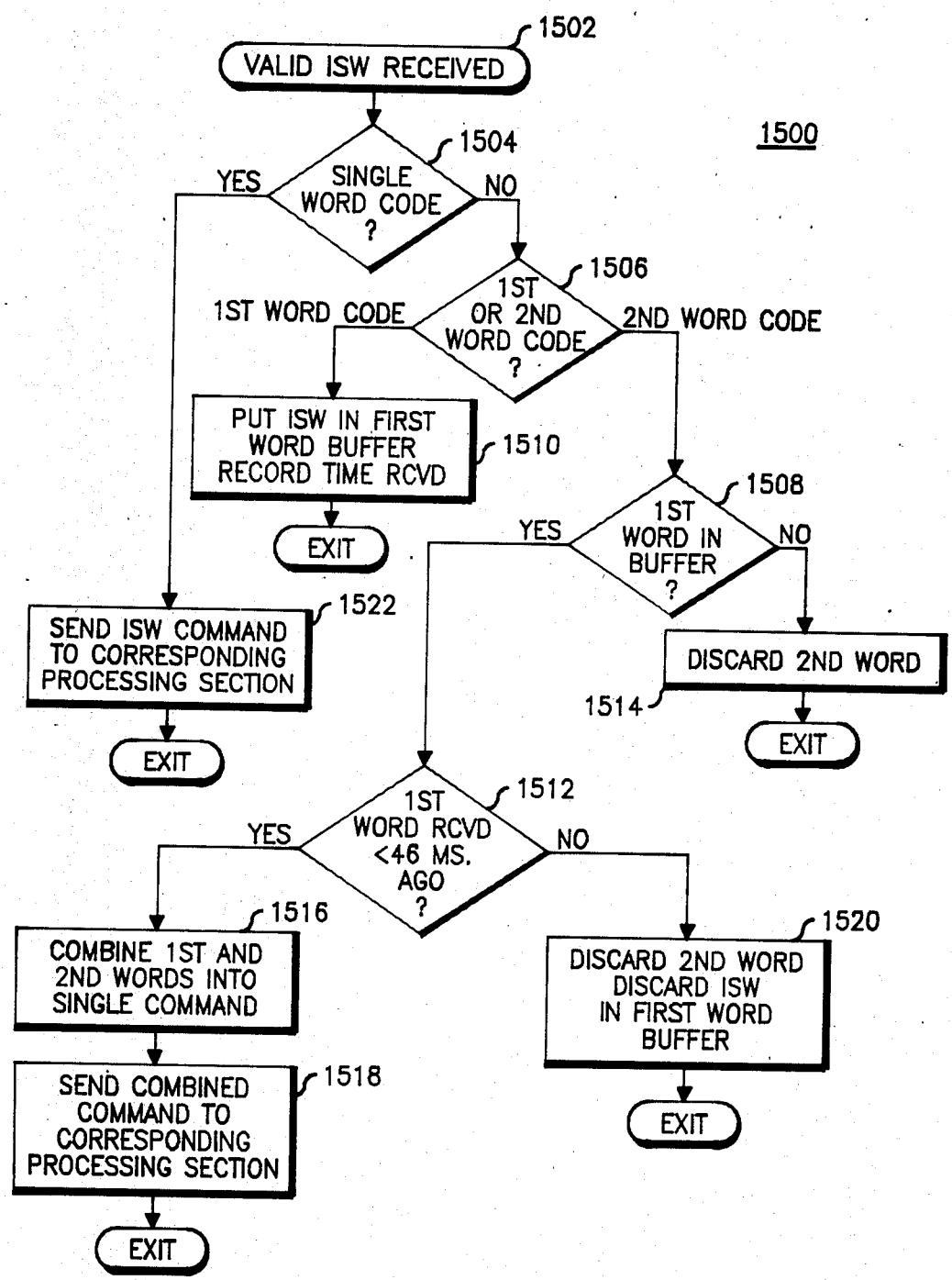

FIG. 15 illustrates how the Trunking Central Controller decides that two independently decoded ISW's indeed form a concatenated dual word ISW from a mobile or portable unit. The procedure starts when a single valid ISW word is decoded on the Inbound Control Channel at entry 1502. If decision 1504 detects a valid "single-word code" in the 5 bit ISW status field, then control is passed to item 1522 which handles single word commands in accordance with conventional call processing techniques. If decision 1504 detects a dual-word code, then decision 1506 determines whether the first word code, or second word codes have been received. If the ISW received is a first word, then it is stored in a "First Word Buffer" by item 1510, and the time of reception is recorded.

If a second word ISW has been received, then the First Word Buffer is checked by decision 1508. If no first word is present, then item 1514 discards the second word ISW. If a first word is present in the buffer, then decision 1512 checks the time of reception. If the first word was received more than two word durations ago (46 ms.), then the 2nd word ISW just received, and the first word ISW in the buffer, are discarded by item 1520.

If the first word ISW in the buffer was received within two word times (46 ms), then a valid, concatentated ISW consisting of the first word in the buffer, and the second word just decoded, has been received and item 1516 combines the two ISW words. Item 1518 sends the dual ISW as a combined command to appropriate processing in the Central Controller. In the preferred embodiment of the present invention, the 2nd word code ($09)(hex) initiates the Dual-Word Private call processing of FIG. 16.

Figure 16:
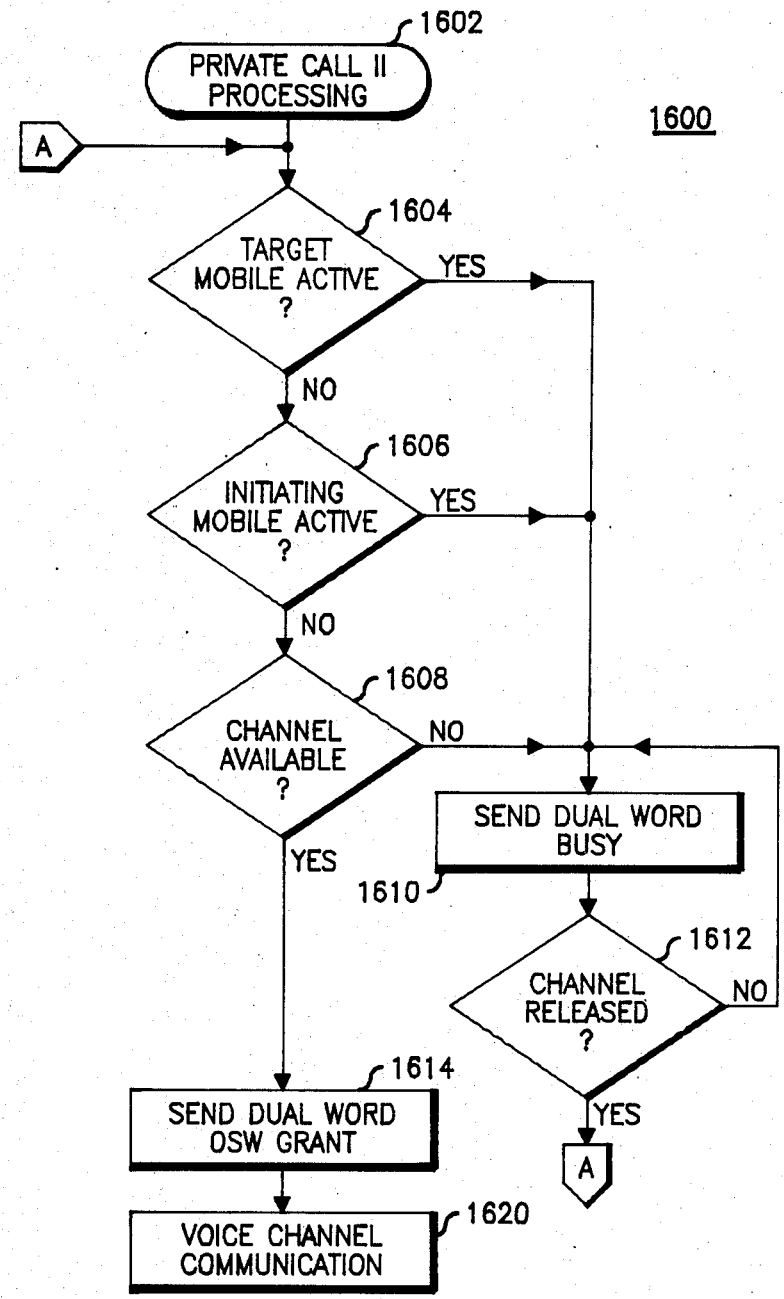

FIG. 16 describes how the trunked system central controller processes dual word private call requests from mobiles and portables. The processing described here takes place between blocks 608 and 612 of FIG. 6 (Requesting Mobile Processing). Control is passed to the private call procedure 1602 of the present invention after a dual-word private call ISW has been successfully decoded as described in FIG. 15.

First decision 1604 checks the I.D. contained in the 2nd word of the dual ISW. This is the I.D. of the target radio. If the target subscriber I.D. is already active on the trunked system, then a dual word "busy" OSW is sent to the requesting unit by the fixed end central controller 110 by item 1610. As mentioned above, FIGS. 12, 13, and 14 describe the specific formatting and encoding of dual word OSW's. When a channel is released from serving a call by decision 1612, then the private call 2 procedure is restarted to determine whether the "busy" OSW can be replaced by a "channel grant" OSW. Otherwise, decision 1612 and item 1610 continue to send the dual-word "busy OSW".

If the target mobile is not active as determined by decision 1604, then the I.D. contained in the first word is assumed to be that of the initiating unit. This I.D. is also checked by decision 1616 to see whether it is currently involved in a channel assignment on the trunked system. If it is active, then a dual-word "busy" is sent by item 1610 according to the procedure described above.

If the initiating and target subscriber unit I.D.'s are not involved in trunked system calls, then item 1608 determines whether a channel is available for assignment to the private call. If a channel is not available, item 1610 is selected and the "busy" control sequence is entered as described above.

If the initiating and target Unit I.D.'s are not involved in trunked system calls, and a channel is available for assignment, then a dual word OSW grant is sent on the outbound control channel to the initiating and target units. The format and encoding of this dual word OSW was described above in conjunction with FIGS. 12, 13, and 14.

After the dual word grant is sent, Voice Channel communications can commence at item 1620, as described according to the procedures of FIGS. 5, 6, 7, and 8.

Accordingly, an improved dispatch trunked radio system which includes an expanded unifying signalling protocol has been described. The improved dispatch trunked radio system of the present invention may be advantageously used to implement enhanced system features while remaining compatible with prior dispatch trunked radio systems. The subscriber units of the present invention are capable of generating and receiving signalling information in accordance with a single word or concatenated dual-word signalling scheme. The central control unit also decodes and generates signalling information in accordance with a single or concatenated dual-word signalling scheme, and generates channel controlling information in accordance with the signalling scheme of the present invention. While the teachings of the present invention have been disclosed in the context of channel assignments the dual-word signalling protocol of the present invention may be advantageously used to provide an array of other system features. Accordingly, other uses and modifications will be obvious to one of ordinary skill in the art without departing from the spirit and scope of the principles of the present invention.

I claim:

1. An improved dispatch trunked radio system having variable length messages, said system comprising:
   (a) a plurality of subscriber units which are capable of generating inbound signalling information and of receiving outbound signalling information in accordance with a signalling scheme, said signalling scheme comprising, in part, inbound messages including:
      (i) a first inbound data word of a predetermined bit length organized in fields, wherein a first fixed field portion represents a requesting subscriber unit's unique identification code, and a second fixed field which comprises a call type field representing system control codes wherein at least one of said system control codes comprises an instruction to search for a second subsequent data word or to decode said first inbound signalling word as a single word message; and (ii) an optional second inbound data word of a predetermined bit length organized in fields, wherein a first fixed field portion represents a target subscriber unit's unique identification code, or a system feature code depending on the contents of the call type field of said first inbound signalling word, and a second fixed field represents a desired call type; and (b) central control unit means for decoding said first inbound data word and said optional second inbound data word and for generating outbound signalling information in accordance with said signalling scheme, wherein said outbound signalling information includes transmission of channel grants to said subscriber units based on a predetermined control algorithm, wherein said channel grants include at least:

(i) a first outbound data word of a predetermined bit length organized in fields, said data word having a fixed prefix field corresponding to a target subscriber unit I.D., an individual bit portion, and a status field; and (ii) a second outbound data word of a predetermined bit length organized in fields, having a first fixed field, an individual bit field and a second channel status field, said second channel status field containing information for interpreting the contents of said fixed prefix field and said first fixed field of said outbound data words.

2. The apparatus as recited in claim 1 wherein said optional second inbound data word must be received within a predetermined time of the receipt of said first inbound data word.

3. The apparatus as recited in claim 1 wherein said inbound messages are sent in predetermined time slots.

4. The apparatus as recited in claim 1 wherein said outbound channel grants contain a preamble having a sync signal.

5. The apparatus as recited in claim 1 wherein said first and second inbound data words are decoded separately, one word at a time.

6. The apparatus as recited in claim 1 wherein the receipt of two first inbound data words in a sequence causes the first inbound data word received to be discarded.

7. The apparatus as recited in claim 1 wherein each of said first and second inbound data words further contain error correction codes which ensure said first and second inbound data words were received in consecutive time slots.

8. A method of controlling a dispatched trunked communication system having a plurality of subscriber units, a plurality of trunked repeaters and a fixed end central controller coupled to said trunked repeaters wherein said subscriber units communicate with said trunked repeaters under the control of said fixed end central controller, said method comprising the steps of:

(a) a subscriber unit requesting service by transmitting a voice channel request in the form of an inbound dual signalling word to the fixed end central controller on a predetermined inbound control channel through said trunked repeaters;

(b) receiving with said subscriber unit a voice channel grant in the form of a dual word outbound signalling word on an outbound control channel said dual word outbound signalling word generated by said fixed end central controller and transmitted by said trunked repeaters;

(c) receiving with said subscriber unit a high speed hand shake on an outbound assigned voice channel from the fixed end central controller, wherein the high speed hand shake contains identification code of the requesting subscriber unit;

(d) receiving with the fixed end central controller a high speed acknowledge signal transmitted by the subscriber units on the predetermined inbound control channel;

(e) transmitting low speed acknowledge signal from the subscriber unit to the fixed end central controller through the trunked repeater;

(f) receiving voice and a low speed subaudible hand shake with said subscriber unit, transmitted by the trunked repeaters from the fixed end central controller;

(g) simultaneously communicating a subaudible hand shake signal and a voice signal between the subscriber unit and the fixed end central controller on the assigned voice channel while communicating with said fixed end central controller;

(h) transmitting with a repeater to the subscriber unit the voice channel generated by the fixed end central controller in the form of a dual word on the outbound control channel for the duration of the requesting subscriber unit transmission;

(i) transmitting from the subscriber unit to the fixed end central controller a subaudible disconnect signal indicating end of transmission to the fixed end central controller; and (j) transmitting with a repeater to the subscriber unit a subaudible central disconnect signal with the fixed end central controller on the outbound voice channel after receiving the end of transmission signal from the subscriber unit.

9. The apparatus as recited in claim 8 wherein said optional second data word must be received within a predetermined time of the receipt of said first data word.

10. The apparatus as recited in claim 8 wherein said inbound messages are sent in predetermined time slots.

11. The apparatus as recited in claim 8 wherein said outbound messages contain a preamble having a sync signal.

12. The apparatus as recited in claim 8 wherein said first and second words are decoded separately, one word at a time.

13. The apparatus as recited in claim 8 wherein the receipt of two first words in a sequence cause the first word received to be discarded.

14. The apparatus as recited in claim 8 wherein each of said first and second data words further contain error correction codes which ensure said first and second words were received in consecutive time slots.

15. A method of transmitting and receiving messages between a transmitter and a receiver, comprising the steps of:

in the transmitter:

(a) transmitting a first data packet having at least one dedicated field contained therein, wherein said dedicated field is comprised of coded data that is first data packet information, and wherein said dedicated field can selectively be an indication that an associated second data packet will be transmitted following transmission of said first data packet; and (b) optionally transmitting a second data packet, wherein said second data packet includes at least one field that comprises coded data that is second data packet information, provided that said second data packet is only transmitted following transmission of a first data packet having said indication that an associated second data packet will be subsequently transmitted; and in the receiver:

(c) decoding, if received by said receiver, said first data packet to determine its contents, such that:
  (1) if said first data packet does not include said indication that an associated second data packet will be transmitted, said receiver accepts information contained in said first data packet;
  (2) if said first data packet does include said indication that an associated second data packet will be transmitted, said receiver does not yet accept information contained in said first data packet; and (d) decoding, if transmitted by said transmitter and received by said receiver, said second data packet to determine its contents, such that;
  (1) if said second data packet was not preceded by reception, within a predetermined period of time, of a first data packet having an indication that an associated second data packet would be subsequently transmitted, said receiver will not accept information contained in said second data packet; and
  (2) if said second data packet was preceded by reception, within a predetermined period of time, of a first data packet having an indication that an associated second data packet would be subsequently transmitted, said receiver will accept information contained in both said second data packet and in said first data packet.

16. A method of receiving at least one data packet in a receiver, wherein said data packet may be selectively comprised of:
  a first data packet that includes data that is first data packet information, and wherein said first data packet can selectively include an indication that an associated second data packet will be transmitted following transmission of said first data packet; and
  an optional second data packet, wherein said second data packet includes at least some data that is second data packet information;

the method comprising the steps of:
(a) receiving a data packet;
(b) decoding said data packet to determine its contents;
(c) if said data packet includes said indication that an associated second data packet will be transmitted, storing at least some information representative of said data packet in memory to await reception of said second data packet;
(d) if said data packet includes data that is first data packet information, but does not includes said indication that an associated second data packet will be transmitted, accepting information contained in said data packet; and
(e) if said data packet includes data that is second data packet information, accepting information contained in said data packet, unless reception of said data packet did not occur within a predetermined time period following reception of a first data packet that included said indication that an associated second data packet will be transmitted.

* * * * *